United States Patent
Berzins et al.

(10) Patent No.: US 10,748,889 B2
(45) Date of Patent: Aug. 18, 2020

(54) POWER GRID AND STANDARD CELL CO-DESIGN STRUCTURE AND METHODS THEREOF

(71) Applicant: Samsung Electronics Co., Ltd., Suwon-si, Gyeonggi-do (KR)

(72) Inventors: Matthew Berzins, Cedar Park, TX (US); Andrew Paul Hoover, San Jose, CA (US); Christopher Alan Peura, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 16/274,229

(22) Filed: Feb. 12, 2019

(65) Prior Publication Data
US 2019/0385999 A1 Dec. 19, 2019

Related U.S. Application Data

(60) Provisional application No. 62/685,892, filed on Jun. 15, 2018, provisional application No. 62/686,553, filed on Jun. 18, 2018.

(51) Int. Cl.
*H01L 27/02* (2006.01)
*H01L 23/522* (2006.01)
(Continued)

(52) U.S. Cl.
CPC ........ *H01L 27/0207* (2013.01); *G06F 30/327* (2020.01); *G06F 30/392* (2020.01); *G06F 30/394* (2020.01); *G06F 30/398* (2020.01); *H01L 23/5226* (2013.01); *H01L 27/11807* (2013.01); *H01L 29/42372* (2013.01);
(Continued)

(58) Field of Classification Search
CPC ............... G06F 17/505; G06F 17/5072; G06F 17/5077; G06F 17/5081; H01L 23/5226; H01L 27/0207; H01L 27/11807; H01L 29/42372
See application file for complete search history.

(56) References Cited

U.S. PATENT DOCUMENTS 8,072,003 B2 12/2011 Becker et al.
9,595,515 B2 3/2017 Becker et al.
(Continued)

OTHER PUBLICATIONS

Wang, Xinning et al., "Design-Technology Co-Optimization of Standard Cell Libraries on Intel 10nm Process", IEDM18-636, 2018 IEEE.

*Primary Examiner* — Allan R Wilson
(74) *Attorney, Agent, or Firm* — Renaissance IP Law Group LLP

(57) ABSTRACT

According to one general aspect, an apparatus may include a metal layer having a metal pitch between metal elements, and a gate electrode layer having a gate pitch between gate electrode elements, wherein the gate electrode pitch is a ratio of the metal pitch. The apparatus may include at least two power rails coupled, by via staples, with the metal layer, wherein the via staples at least partially overlap one or more of the gate electrode elements. The apparatus may include even and odd pluralities of standard cells, each respectively located in even/odd placement sites wherein portions of the standard cells that carry signals within the metal layer do not connect to the via staples.

18 Claims, 8 Drawing Sheets

(51) Int. Cl.
  *H01L 27/118* (2006.01)
  *H01L 29/423* (2006.01)
  *G06F 30/327* (2020.01)
  *G06F 30/392* (2020.01)
  *G06F 30/394* (2020.01)
  *G06F 30/398* (2020.01)

(52) U.S. Cl.
  CPC .............. *H01L 2027/11866* (2013.01); *H01L 2027/11875* (2013.01); *H01L 2027/11881* (2013.01)

(56) References Cited

U.S. PATENT DOCUMENTS

| | | |
|---|---|---|
| 9,905,576 B2 | 2/2018 | Becker et al. |
| 2013/0133937 A1* | 5/2013 | Choi ................. H01L 23/49822 174/261 |
| 2013/0154128 A1* | 6/2013 | Wang ................. H01L 23/5286 257/786 |
| 2015/0084097 A1* | 3/2015 | Jeon ................. H01L 27/11807 257/206 |
| 2016/0049369 A1* | 2/2016 | Heo .................... H01L 23/5286 327/540 |
| 2017/0148779 A1 | 5/2017 | Becker |
| 2017/0294448 A1 | 10/2017 | Debacker et al. |
| 2018/0033701 A1 | 2/2018 | Bouche et al. |
| 2018/0145075 A1 | 5/2018 | Smayling et al. |
| 2019/0123140 A1* | 4/2019 | Park ................. H01L 21/823418 |
| 2019/0355749 A1* | 11/2019 | Do ...................... G06F 17/5068 |

\* cited by examiner

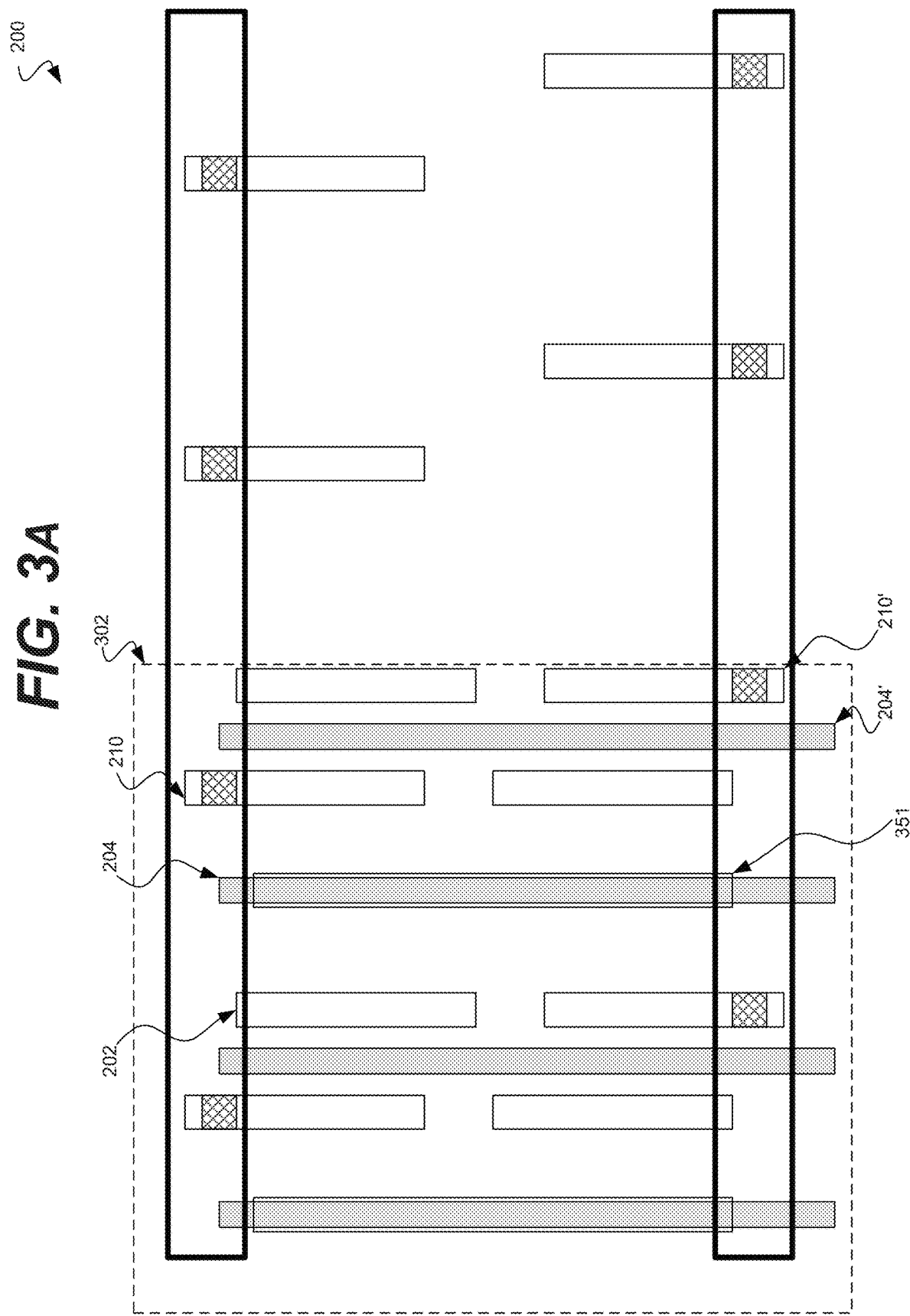

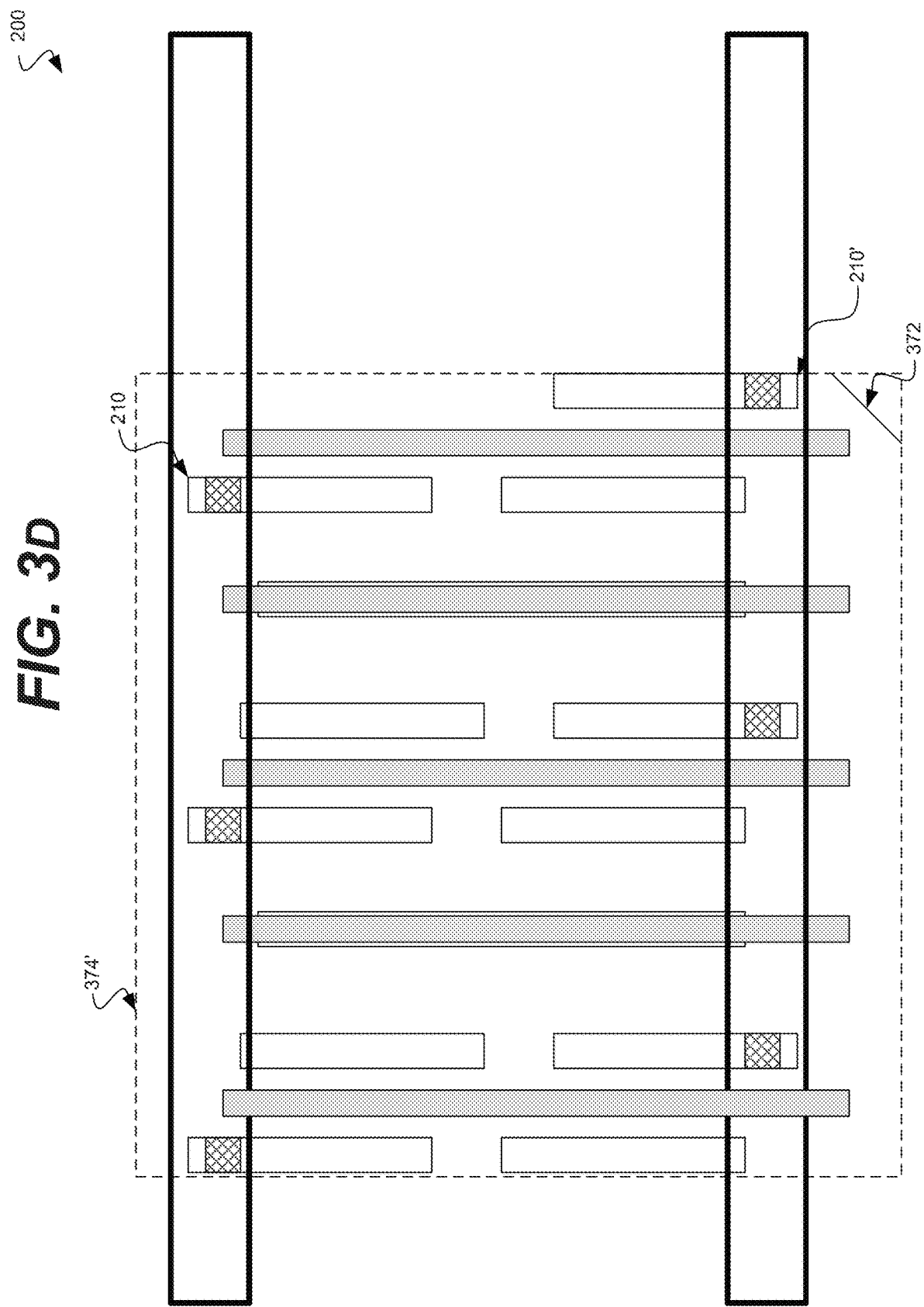

POWER GRID AND STANDARD CELL CO-DESIGN STRUCTURE AND METHODS THEREOF

CROSS-REFERENCE TO RELATED APPLICATION

This application claims priority under 35 U.S.C. § 119 to Provisional Patent Application Ser. No. 62/685,892, entitled "POWER GRID AND STANDARD CELL CO-DESIGN STRUCTURE AND METHODS THEREOF" filed on Jun. 15, 2018. The subject matter of this earlier filed application is hereby incorporated by reference.

This application claims priority under 35 U.S.C. § 119 to Provisional Patent Application Ser. No. 62/686,553, entitled "POWER GRID AND STANDARD CELL CO-DESIGN STRUCTURE AND METHODS THEREOF" filed on Jun. 18, 2018. The subject matter of this earlier filed application is hereby incorporated by reference.

TECHNICAL FIELD

This description relates to integrated circuit design, and more specifically to power grid and standard cell co-design structure and methods thereof.

BACKGROUND

Traditionally integrated circuits (IC) are created in layers. During the first portion of chip-making (or front-end-of-line), the individual components (transistors, capacitors, etc.) are fabricated on the wafer. These individual components are often arranged in standardized cells or standard circuit cells (e.g., a NAND gate, a NOR gate) that may be laid out and repeated in identical and predictable iterations, like Lego blocks.

In the back-end-of-line, these components are connected to each other to distribute signals, as well as power and ground. Generally, there is not enough room on the chip surface to create all those connections in a single layer, so chip manufacturers build vertical levels of interconnects. These layers are stacked one a top another (like a cake) and include various conducting (e.g., metal, semiconductor) layers, and non-conducting layers. While simpler integrated circuits may have just a few metal layers, complex ICs can have ten or more layers of wiring. These layers may, as needed, be connected to one another by vias which go vertically through layers, and provide an electrical signal a way or path to traverse from one layer to another.

SUMMARY

According to one general aspect, an apparatus may include a metal layer having a metal pitch between metal elements. The apparatus may include a gate electrode layer having a gate pitch between gate electrode elements, wherein the gate electrode pitch is a ratio of the metal pitch. The apparatus may include at least two power rails coupled, by via staples, with the metal layer, wherein a first set of via staples associated with a first power rail are unaligned with respect to a second set of via staples associated with a second power rail. The apparatus may include an even plurality of standard cells, each respectively located in an even placement site wherein portions of the standard cells that carry signals within the metal layer do not connect to the via staples. The apparatus may include an odd plurality of standard cells, each of the odd plurality of standard cells is a shifted version of a corresponding one of the even plurality of standard cells, and each of the odd plurality of standard cells is respectively located in an odd placement site wherein portions of the standard cells that carry signals within the metal layer do not connect to the via staples.

According to another general aspect, apparatus may include a processor that includes an integrated circuit formed, in part, of standard circuit cells powered by a power gird. The integrated circuit may include a metal layer having a metal pitch between metal elements; a gate electrode layer having a gate pitch between gate electrode elements, wherein the gate electrode pitch is a ratio of the metal pitch; a power grid coupled, by via staples, with the metal layer, wherein the via staples at least partially overlap one or more of the gate electrode elements; at least two power rails coupled, by the via staples, with the metal layer, wherein a first set of via staples associated with a first power rail are unaligned with respect to a second set of via staples associated with a second power rail; a first plurality of standard circuit cells, each respectively located such that portions of the standard cells that carry signals within the metal layer do not connect to the via staples; and a second plurality of standard circuit cells, each of the second plurality of standard circuit cells is a shifted version of a corresponding one of the first plurality of standard circuit cells, and each of the second plurality of standard circuit cells is respectively located such that portions of the standard circuit cells that carry signals within the metal layer do not connect to the via staples.

According to another general aspect, an apparatus may include a place-and-route tool configured to place standard circuit cells within a circuit design. The place-and-route tool may be configured to: establish a metal layer having a metal pitch between metal elements; establish a gate electrode layer having a gate pitch between gate electrode elements, wherein the gate electrode pitch is a ratio of the metal pitch; route at least one power rail coupled, by via staples, with the metal layer, wherein a first set of via staples associated with a first power rail are unaligned with respect to a second set of via staples associated with a second power rail; place an even plurality of standard cells, each respectively located in an even placement site wherein portions of the standard cells that carry signals within the metal layer do not connect to the via staples; and place an odd plurality of standard cells, each of the odd plurality of standard cells is a shifted version of a corresponding one of the even plurality of standard cells, and each of the odd plurality of standard cells is respectively located in an odd placement site wherein portions of the standard cells that carry signals within the metal layer do not connect to the via staples.

The details of one or more implementations are set forth in the accompanying drawings and the description below. Other features will be apparent from the description and drawings, and from the claims.

A system and/or method for integrated circuit design, and more specifically to power grid and standard cell co-design structure and methods thereof, substantially as shown in and/or described in connection with at least one of the figures, as set forth more completely in the claims.

BRIEF DESCRIPTION OF THE DRAWINGS

FIGS. 3A, 3B, 3C and 3D are block diagrams of example embodiments of a system in accordance with the disclosed subject matter.

Like reference symbols in the various drawings indicate like elements.

DETAILED DESCRIPTION

Figure 1:
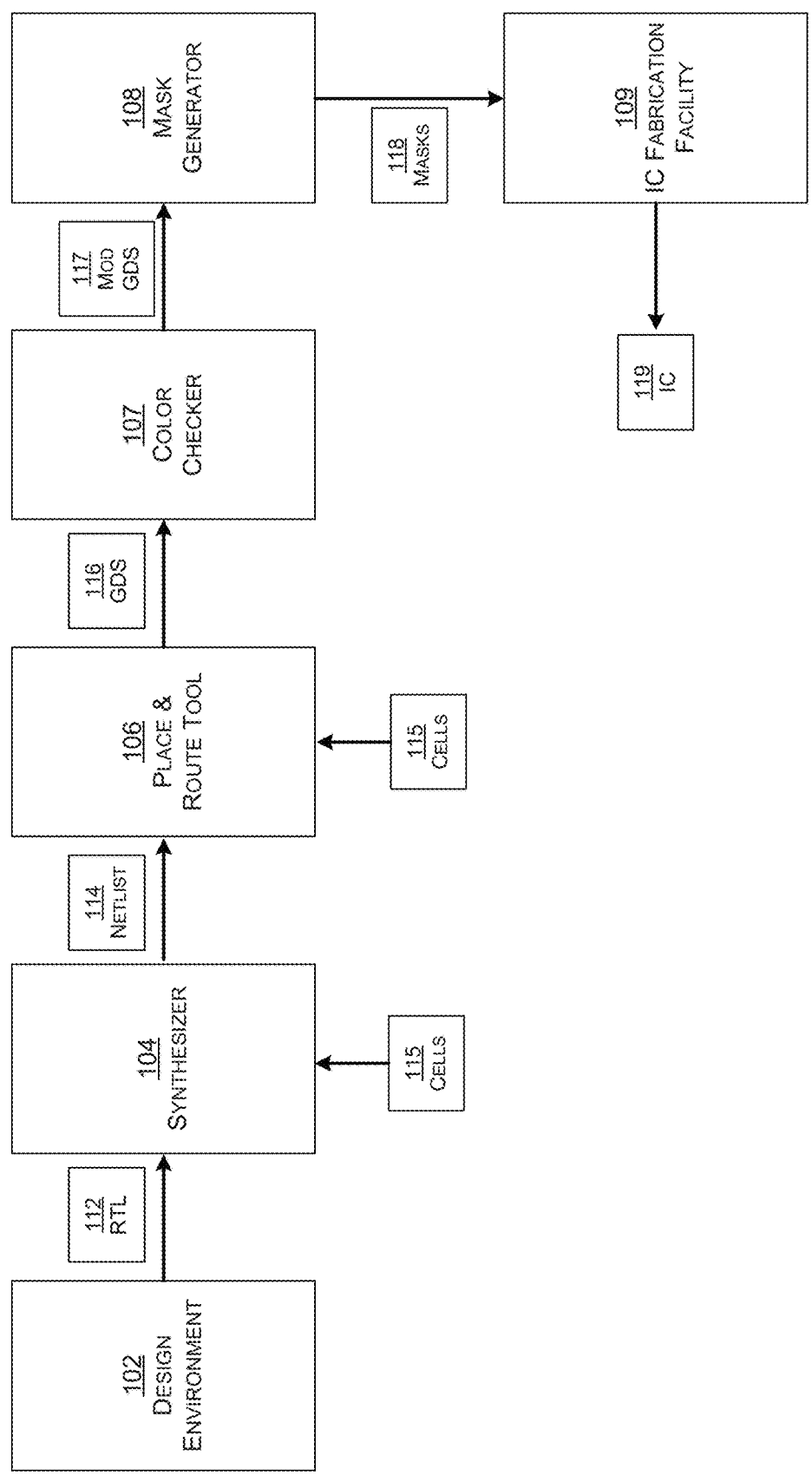
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Traditionally, there have been three conventional means to have a low resistance power grid. Either a power rail—the line that conducts positive (Vdd) or negative (Vss) power—is: sandwiched between a first metal layer (M1, or "metal one") and a second metal layer (M2 or "metal two"); sandwiched between the M1 layer and a third metal layer (M3 or "metal three"); or a wide M1 rail is used with some sporadic M2 strapping.

However, more current techniques are moving away from the popular M1/M2 sandwich in large part because current techniques are frequently requiring that M1 be a unidirectional in the horizontal direction and M2 be unidirectional in the vertical direction, thus preventing sandwiching.

Wide M1 or M1/M3 sandwiched power rails often require vertical a M2 strap or pass-through, which is generally referred to as "stapling" or a "via staple". In which case, an M3 layer is connected to the M1 layer by a via from M3 to M2, running along a short portion of M2, and then by another via from M2 to M1. Unfortunately, this M2 power staple (or via staple) often interferes with cell placement because standardized cells often use M2 signal routes, and these in the cell M2 signal routes collide with the via staples. Therefore, a technological solution to this technical problem is desired.

FIG. 1 is a block diagram of an example embodiment of a system 100 in accordance with the disclosed subject matter. In various embodiments, the system 100 may be used for electronic design automation and may represent a few illustrative stages of the design process for creating integrated circuits. In such an embodiment, the system 100 may include a number of design tools.

In various embodiments, the system 100 may include a design environment 102 in which a user (not shown) may define (e.g., via a hardware description language, etc.) the features and functionality of an IC. The output of the design environment 102 may include one or more files 112 that logically define the IC (e.g., register transfer level (RTL) files, etc.).

In some embodiments, these RTL files 112, may be passed through a synthesizer 104 or synthesis tool. In such an embodiment, the synthesizer 104 may convert an abstract form of desired circuit behavior (e.g., the RTL files 112) into a design implementation represented in terms of logic gates or a netlist 114. These logic gates may include standard cells and the synthesizer 104 may use a library of standard cells 115 as input, in addition to the RTL files 112. In some embodiments, this process may be done by hand or manually. In another embodiment, the process may occur via a combination of manual and automated steps.

In the illustrated embodiment, the system 100 may include a place and route tool 106. In such an embodiment, the place and route tool 106 may be configured to take the netlist 114 and produce an IC layout that may be automatically converted to a mask set. As the name suggests a place and route tool 106 may be configured to place the various circuits described in the netlist 114 in an order or arrangement suitable for manufacture (or the next stage in the design process), and then route interconnecting wires between the various circuits. The distinction between different steps in system 100 is for exemplary purposes only. For example, the synthesizer 104 and the place and route tool 106 may be separate steps, as illustrated in FIG. 1, or they may be combined into a single step or electronic design automation tool. Other combinations of steps are possible, and the illustrated division of steps in FIG. 1 is not meant to restrict the scope of the present disclosed subject matter, as will be apparent to those skilled in the art.

In such an embodiment, the place and route tool 106 may make use of a library of standardized circuit cells 115. For example, the library of circuit cells 115 may include a cell for a NAND gate. In such an embodiment, the place and route tool 106 may instantiate that template of the NAND gate wherever in the design such a NAND gate is needed or used, likewise for NOR gates, flip-flops, etc. As such, all instances of that NAND cell will have the same metal shapes on the same layers, etc. Generally, a place and route tool 106 may layout, or "place", the cells 115 in a grid pattern of rows and/or columns.

In various embodiments, the place and route tool 106 may be configured to use the shifted sets of standardized cells, as described below. As described below, these standardized cells 115 may be created to take into account the location and spacing of any via staples that may occur in the design power grid. In such an embodiment, the place and route tool 106 may be configured to select between various version of a standardized cell for placement. In such an embodiment, these various versions may produce the same logical function (e.g., a NAND gate) but may differ in the positioning, placement, or composition of interior elements (e.g., gates, transistors, signal wires) such that different versions may be more advantageous for a given placement or routing situation than another version would be. A few example versions and placement considerations are discussed in detail in regards to the other figures.

In various embodiments, the place and route tool 106 may output a file 116 presenting planar geometric shapes, text labels, and other information about the layout in hierarchical form. In the illustrated embodiment, this file may be substantially compliant with the Graphics Data System (GDS) file format, or file formats derived from that standard (e.g., GDSII, etc.). In another embodiment, the Open Artwork System Interchange Standard (OASIS) may be employed. In yet another embodiment, some other standard may be employed. It is understood that the above are merely a few illustrative examples to which the disclosed subject matter is not limited.

In the illustrated embodiment, the system 100 may include a design rule or color checker 107. In various embodiments, the color checker 107 may check for and/or correct design rule violations created by the place and route tool 106. In some embodiments, the color checker 107 may be integrated with the place and route tool 106, but is shown separately here for illustrative purposes. In such an embodiment, the color checker 107 may produce a modified GDS 117.

In various embodiments, the system 100 may include a mask generator 108 that is configured to generate one or more masks 118 from the modified GDS 117. The mask generator 108 may include the function of mask data preparation. These masks 118 may then be used to manufacture the IC 119, via an IC fabrication facility 109.

Figure 2A:
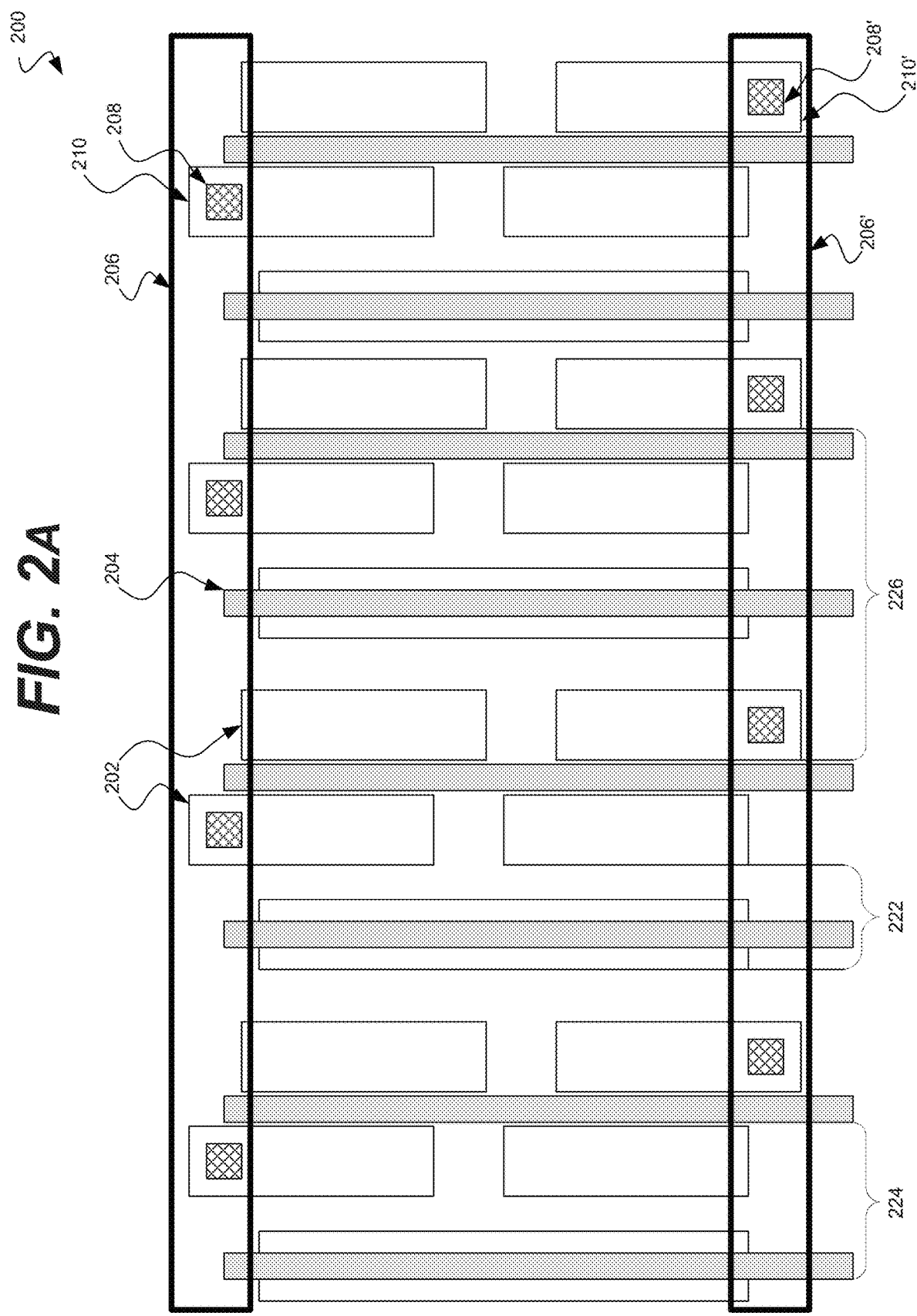
FIGS. 2A and 2B are block diagrams of example embodiments of a system in accordance with the disclosed subject matter.
Figure 2B:
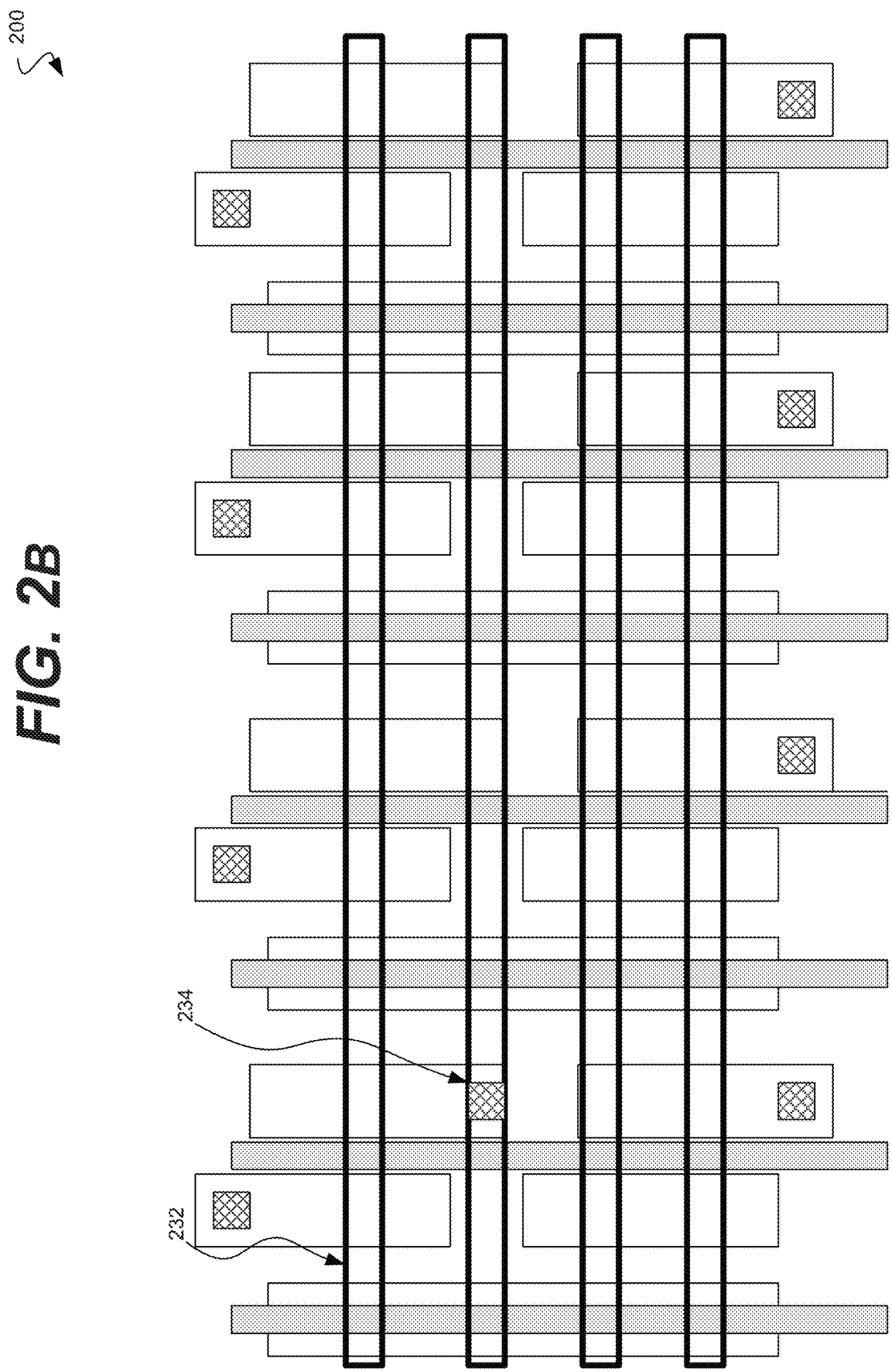

FIGS. 2A and 2B are block diagrams of example embodiments of a system 200 in accordance with the disclosed subject matter. In the illustrated embodiment, the system 200 includes an illustrative portion of an integrated circuit. Specifically, the figures focus on the interaction of a few metal layers and gate electrode. The gate electrodes may include polysilicon, or another conducting material, such as a metal. Note, that the size of the elements is exaggerated in this first series of figures for illustrative effect. It is understood that these are merely a few illustrative example elements to which the disclosed subject matter is not limited.

In the illustrated embodiment, the system 200 may include various M2 portions or elements 202. In the illustrated embodiment, M2 portions 202 are illustrated as white rectangles running vertically. While in a real circuit the M2 elements 202 would generally vary in length and shape, in the illustrated embodiment, the M2 elements are shown as a few differing but repeating shapes.

In the illustrated embodiment, the system 200 may include various polysilicon (a.k.a. "poly") or more generally gate electrode elements 204. In the illustrated embodiment, the gate electrode elements 204 are illustrated as grey rectangles running vertically. Again, while in a real circuit the gate electrode elements 204 may differ in length, in the illustrated embodiment, the gate electrode elements 204 are shown as being of uniform length.

In the illustrated embodiment, the system 200 may include one or more power rails 206, which may more generally form a portion of an overall power grid. In the illustrated embodiment, the power rails may include a positive power rail 206 (Vdd) and a negative power rail 206' (Vss), where positive and negative are relative terms to each other. In various embodiments, these power rails 206 may be embodied as an M1/M3 sandwich; although, it is understood that the above is merely one illustrative example to which the disclosed subject matter is not limited. In the illustrated embodiment, these power rails 206 are illustrated as a clear rectangle with a thick border line, and running horizontally.

In the illustrated embodiment, the system 200 may include a plurality of vias 208 (and via 208') or interconnect elements that allow various layers of the system 200 to communicate, or more accurately signals or power connections to pass from a first layer to a second layer. In the illustrated embodiment, the vias 208 are illustrated as cross-hatched squares, and connect the two layers (e.g., power rail 206 and M2 element 202) that intersect at the same point, such as M2 shape or "via staple" 210 and power rail 206 (and likewise with the negative power rail 206' and the via staple 210').

In the illustrated embodiment, the portions of the M2 layer that are connected to the power rail 206 by the vias 208, are referred to as "via staples" 210. As described below, these via staples, and their interaction with standard circuit cells may be a concern of the disclosed subject matter.

Further, in the illustrated embodiment, the elements within the system 200 may be placed at predictable and regular intervals. However, each layer or element type (e.g., metal element, gate electrode element) may be associated with their own respective placement rules. In one embodiment, the distance between metal elements 202 may be the metal pitch 222. In one embodiment, the distance between gate electrode elements 204 may be the gate electrode pitch 224 Likewise, in various embodiments, the distance between the via staples may be the via staple pitch 226. In this context, the term "pitch" means the distance between successive corresponding elements, points, or lines.

FIG. 2B further shows that the standard circuit cells may also have internal vias 234 that connect to various metal layers for the purpose of routing signals through the chip. To aid understanding, the power rails 206 have been removed from the illustration.

In the illustrated embodiment, various pieces 232 of metal layer (e.g., M1 or M3) are shown as clear rectangles with thick borders, running horizontally. In such an embodiment, these pieces 232 of a metal layer may be configured to carry signals and not power. In various embodiments, these metal pieces 232 may be of various lengths and shapes, but here are shown a being uniform.

In the illustrated embodiment, the metal pieces 232 may intersect with portions or elements (e.g., M2 portions 202) of the standard circuit cell. In such an embodiment, occasionally it may be desirable to electrically connect the two layers using a via 234.

Figure 3B:
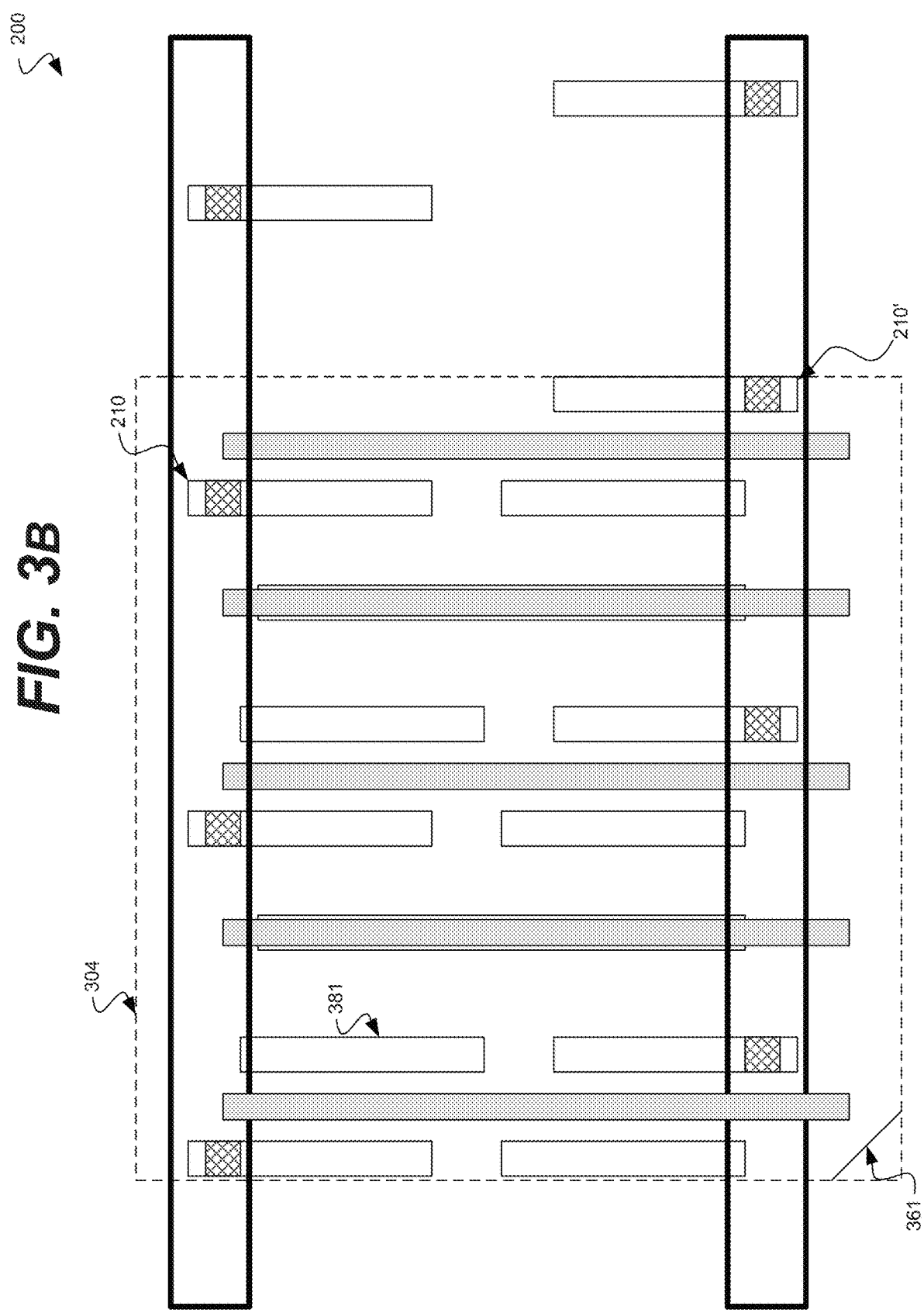

FIGS. 3A and 3B are block diagrams of example embodiments of a system 200 in accordance with the disclosed subject matter. In the illustrated embodiments, two version of standard circuit cells are shown. In FIG. 3A, the system 200 may include a first or "even" version of the standard circuit cell 302.

In various embodiments, as described above, the via staples 210 (and 210') may occur at regular intervals (e.g. the via staple pitch), and may therefore be predictable. In some embodiments, the via staples 210 may not occur at regular intervals but their placement within the system or along the power rails may otherwise be predictable.

Further, in such an embodiment, the positive (Vdd) staples 210 and negative (Vss) staples 210' may occur at different horizontal spacing. For example, in the illustrated embodiment, moving from left to right, the positive (Vdd) staple 210 may occur, then the gate electrode elements 204' may occur, and then the negative (Vss) staple 210' may occur. It is understood that the above is merely one illustrative example to which the disclosed subject matter is not limited.

In various embodiments, Track 0 may be defined as the M2 (or more generally any metal or non-gate electrode) track that aligns with the gate electrode element (e.g., gate electrode element 204). For example, in FIG. 3A, M2 shape 351 is in track 0 because it aligns with gate electrode 204. Track 1 may be defined the M2 track that is just to the left of poly or aligned with the positive staple 210. And, Track 2 may be defined as the M2 track that is just to the right of poly, or aligned with the negative staple 210'. In such an embodiment, the track numbering (e.g., 0, 1, 2) may repeat over and over based upon the repeating poly, staple sequencing. It is understood that the above are merely a few illustrative examples to which the disclosed subject matter is not limited.

In the illustrated embodiment, it is noted that the positive and negative via staples 210 and 210' are not aligned or not on the same track. In the illustrated embodiment, the positive (Vdd) staples and vias 210 occupy Track 1 and the negative (Vss) staples and vias 210' occupy Track 2. In various embodiments, the positive and negative staple placement may be reversed or otherwise un-aligned (e.g., Track 1 and 0). By making positive and negative staples unaligned, additional design flexibility may be achieved. For example, if staples are placed in tracks 1 and 2, a portion of track 1 and 2 may be available for signal routing, as illustrated by the M2 shape below staple 210 and the M2 shape above 210'. It is understood that the above are merely a few illustrative examples to which the disclosed subject matter is not limited.

In such an embodiment, the standard circuit cell 302 may be designed to take a regular and predictable via staple 210 into account. As such, the standard cell 302 may be laid out with empty spaces or predefined areas or locations where the via staples 210 will occur. Returning to the analogy of Lego blocks, as the bumps on Lego blocks occur in regular patterns, a standardized Lego block may include holes (e.g., on the bottom of the block) to accommodate the bumps. In the analogy, the bumps are the via staples 210 and the holes are the locations within the standard cells 302 that accommodate the via staples 210.

In the illustrated embodiment, one may notice that not only do the via staples 210 occur at regular intervals, but the M2 elements 202 and gate electrode elements 204 also occur, or more accurately are only able to occur, at regular intervals. These intervals may be respectively determined by the metal pitch and gate electrode pitch, as described above. Note, while the illustration shows all possible M2 and gate electrode placement positions in use in standard cell 302, in various embodiments, the standard cell 302 may be designed to not have M2 or gate electrode shapes at various points.

However, because of the metal pitch and the gate electrode pitch (or intervals) the standard cell must align, not only with the via staples, but with the metal elements 202 and the gate electrode elements 204 as well. The standard cell 302 may not be placed in any horizontal position with respect to via staple 210. It must be placed in a location horizontally that also causes the internal elements 202 and 204 of the standard cell 302 to align with the metal pitch and the gate electrode pitch. More specifically, if cell 302 is shifted to the right by 1 poly pitch, the M2 shape 202 not align with the pre-determined M2 tracks and may cause a short circuit with staple 210 which is part of a regular array of staples placed along power rail 206. Furthermore, after M2 shape 202 is shifted to the right by 1 poly pitch, it may violate minimum required distance to staple 210, or may cause M2 routing problems because it does not align with pre-determined M2 tracks. In this example, cell 302 may be shifted to the right by an even number of poly pitches, e.g. 0, 2, 4 and so on, without causing a conflict between M2 shapes in the cell 302 and a staple. However, cell 302 cannot be shifted left or right by an odd number of poly pitches without causing such a conflict. As such, a plurality of versions of the standard cell may be required. Each version may perform the same logic function (e.g., NOR gate) but may have differing internal element placing or shapes.

In FIG. 3B, the system 200 may include a second or "odd" version of the standard circuit cell 304. The standard cell 304 may perform the same logic function as the standard cell 302, as described above. But, the standard cell 304 may have different internal element placing. In the illustrated embodiment, the odd standard cell 304 may be shifted version of the even standard cell 302.

In such an embodiment, the even standard cell 302 may be shifted a certain distance until the internal locations for the via staple again aligns with the actual via staples 210 of the system 200. This shifted distance may be determined by the ratio of the gate element pitch and the metal pitch. In the illustrated embodiment, this ratio is 3:2, where three metal elements occur for every two gate electrode elements. As such, the odd standard cell 304 must be shifted one gate pitch from the even standard cell 302 before it may again align with the via staples. In another embodiment, the gate-to-metal electrode pitch ratio may be unequal (i.e., not 1:1, e.g., 3:2) or equal (i.e., 1:1). It is understood that the above are merely a few illustrative examples to which the disclosed subject matter is not limited.

In various embodiments, while the odd standard cell 304 may be shifted a certain number of gate pitches from the even standard cell 302 (to align with the via staples), it may also be flipped. However, flipping a cell can prevent proper alignment between space in the standard cell reserved for a staple and the staples in the power grid. In FIG. 3B, an M2 signal shape 381 inside of cell 304 is shown. If this cell is flipped horizontally, M2 signal shape 381 would short to staple 210. To overcome this issue, a flipped version of the cell may be created.

Figure 3C:
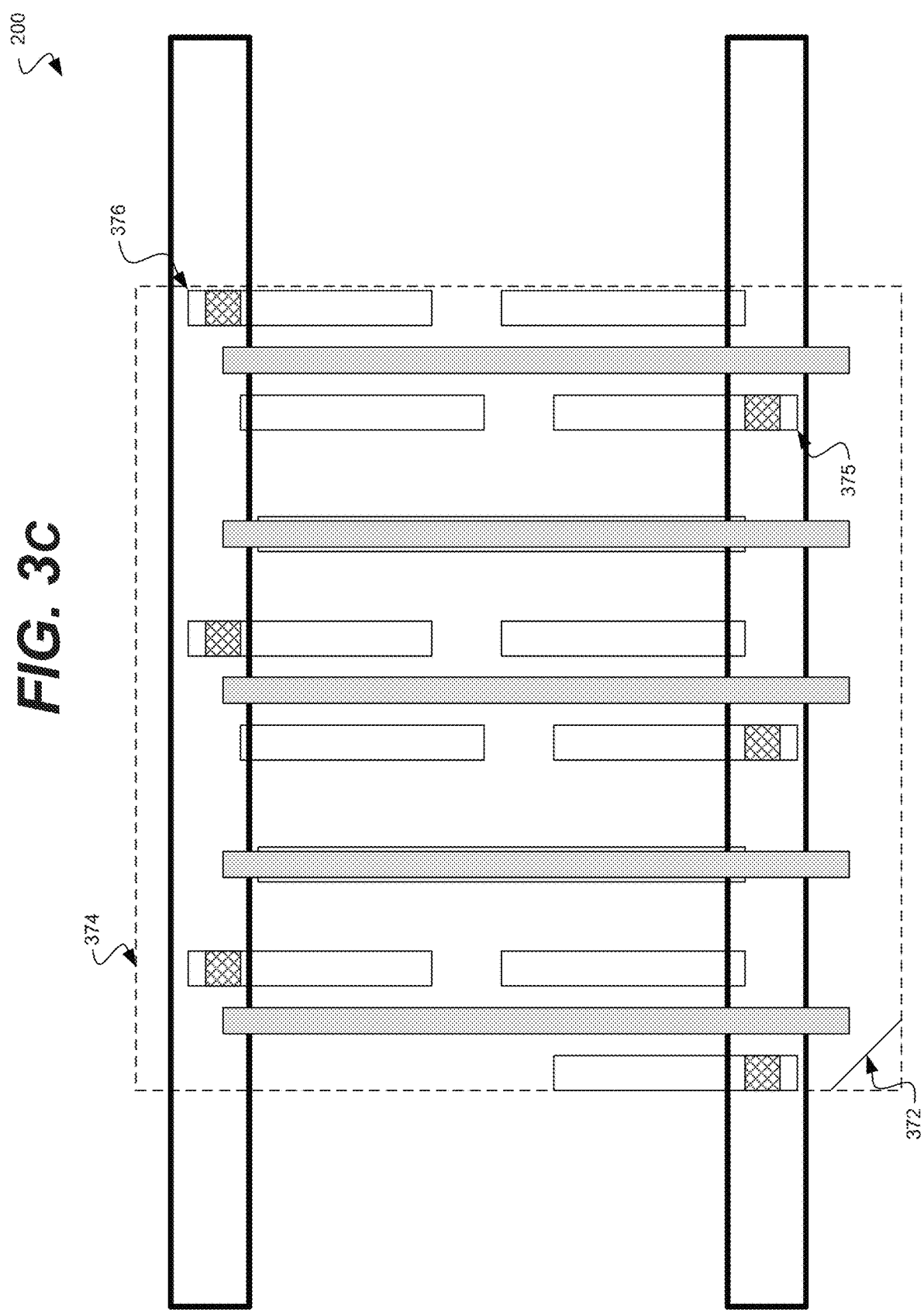

In FIG. 3C, cell 374 illustrates an embodiment of a flipped version of cell 304 in FIG. 3B. Note that the cell origins are identified as 361 and 372 in FIGS. 3B and 3C, respectively. In FIG. 3B, the positive staple 210 is located immediately to the left of a gate electrode ("Track 1") and the negative staple 210' is located immediately to the right of a gate electrode ("Track 2"). In FIG. 3C, the flipped cell 374 reverses or flips this order. The positive staple 376 is located immediately to the right of a gate electrode ("Track 2") and the negative staple 375 is located immediately to the left of a gate electrode ("Track 1"). By flipping the locations reserved for staples in cell 374, the cell will be able to be flipped and avoid conflicts between signal M2 shapes and staples.

FIG. 3D shows cell instantiation 374', which is cell 374 flipped horizontally, as indicated by cell origin 372 being on the right side of the cell. Because staple locations were designed in cell 374 assuming that the cell would be flipped, cell instantiation 374' avoids conflicts between M2 signal shapes and staples 210 and 210'. In an embodiment, there may be not only even site and odd site versions of the cells, but also flipped and non-flipped (4 in total: even non-flipped, even flipped, odd non-flipped, odd flipped). In another embodiment, the placement and/or shape of the gate electrode elements and/or metal elements may differ greatly between different versions of standard cells, such as the even standard cell 302, the odd standard cell 304, and the odd-flipped standard cell 374. However, standard cells 302, 304, and 374, as versions of the same cell, must perform the same logical function and align themselves with the via staple pitch, metal pitch, and gate element pitches. It is understood that the above are merely a few illustrative examples to which the disclosed subject matter is not limited.

In various embodiments, the via staples 210 and 210' may overlap or be overlapped by (at least partially) the gate electrode element 204'. In some embodiments, the via staples 210 and 210' may extend over (or under) the gate electrode element 204' horizontally. It is understood that the above is merely one illustrative example to which the disclosed subject matter is not limited.

Figure 4:
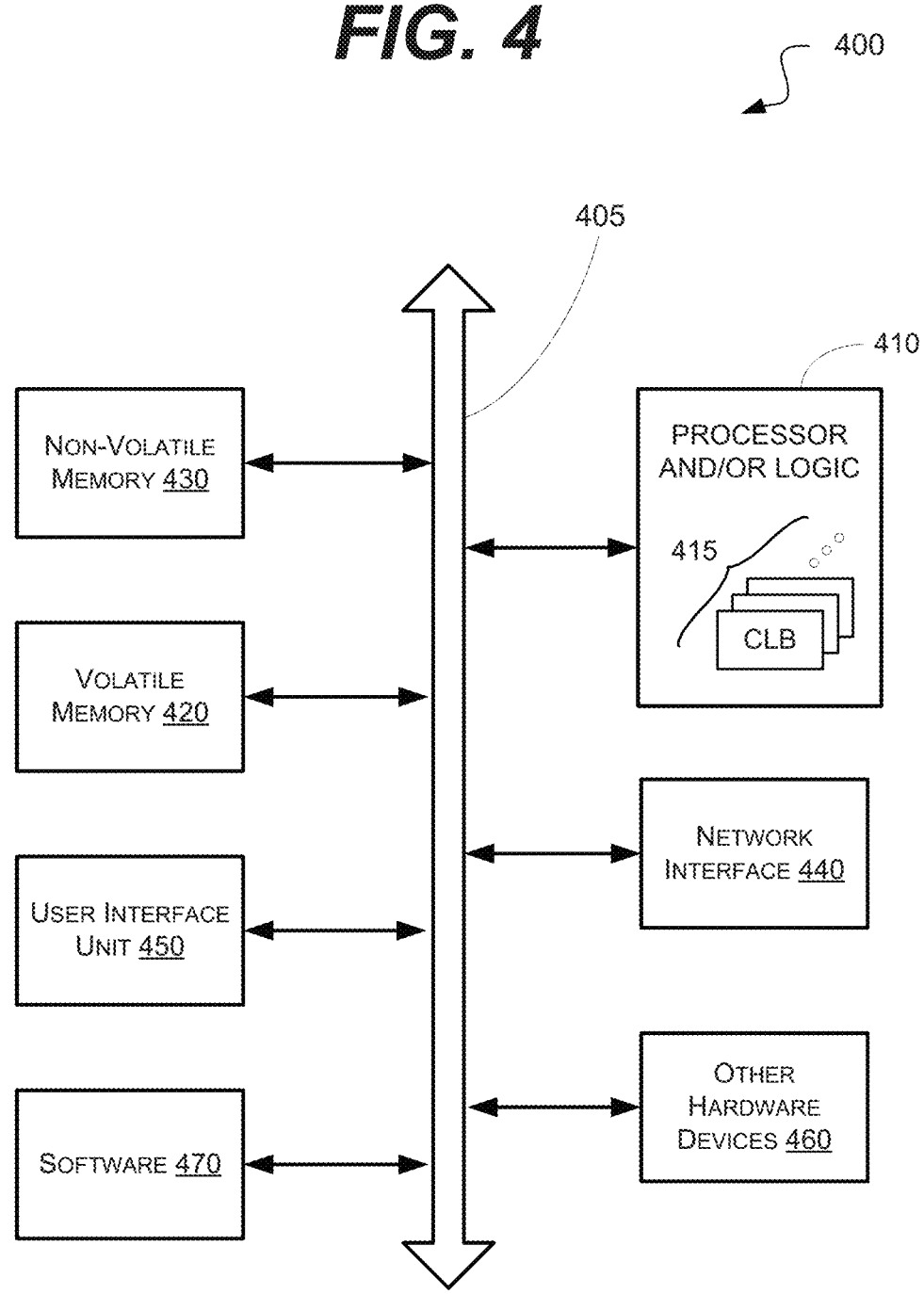
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a metal layer having a metal pitch between metal elements;

a gate electrode layer having a gate pitch between gate electrode elements, wherein the gate electrode pitch is an unequal ratio of the metal pitch;

at least two power rails coupled, by via staples, with the metal layer, wherein a first set of via staples associated with a first power rail are unaligned with respect to a second set of via staples associated with a second power rail;

plurality of first standard cells, each respectively located in an even placement site wherein portions of the standard cells that carry signals within the metal layer do not connect to the via staples; and plurality of second standard cells, one or more of the second standard cells being a shifted version of corresponding ones of the first standard cells, and each of the second standard cells is respectively located in an odd placement site wherein portions of the standard cells that carry signals within the metal layer do not connect to the via staples.

2. The apparatus of claim 1, wherein each of the first plurality of standard cells include locations for via staples; and wherein each of the second plurality of standard cells include locations for via staples that are shifted a number of gate electrode pitches from corresponding locations for via staples in the respective first plurality of standard cells.

3. The apparatus of claim 1, wherein the via staples are located at regular intervals of a multiple of the metal pitch.

4. The apparatus of claim 1, wherein the ratio of gate electrode pitch to metal pitch is such that three metal elements occur for every two gate electrode elements; and wherein the via staples occur at a pitch which is a multiple of every third metal element.

5. The apparatus of claim 1, wherein the via staple locations at least partially overlap the gate electrode locations.

6. The apparatus of claim 1, wherein each of the standard cells include a spacing for the via staples; and wherein a location of the spacing for the via staples determines whether the standard cell is included in the first plurality of standard cells or the second plurality of standard cells.

7. The apparatus of claim 6, wherein each of the second plurality of standard cell includes a version of a corresponding one of the first plurality of standard cells that is shifted such that the location of the spacing for the via staple aligns with both a via staple and the gate electrode pitch.

8. The apparatus of claim 6, further including a flipped plurality of standard cells that include mirrored versions of portions of the first plurality and the second plurality of standard cells, wherein each of the flipped plurality of standard cells includes a flipped version of a corresponding one of the standard cells that is flipped in such a way that the location of the spacing for the via staple aligns with both a via staple and the gate electrode pitch.

9. An apparatus comprising:

a processor that includes an integrated circuit formed, in part, of standard circuit cells powered by a power gird, the integrated circuit comprising:

a metal layer having a metal pitch between metal elements;

a gate electrode layer having a gate pitch between gate electrode elements, wherein the gate electrode pitch is an unequal ratio of the metal pitch;

a power grid coupled, by via staples, with the metal layer, wherein the via staples at least partially overlap one or more of the gate electrode elements;

at least two power rails coupled, by the via staples, with the metal layer, wherein a first set of via staples associated with a first power rail are unaligned with respect to a second set of via staples associated with a second power rail;

a first plurality of standard circuit cells, each respectively located such that portions of the standard cells that carry signals within the metal layer do not connect to the via staples; and a second plurality of standard circuit cells, each of the second plurality of standard circuit cells is a shifted version of a corresponding one of the first plurality of standard circuit cells, and each of the second plurality of standard circuit cells is respectively located such that portions of the standard circuit cells that carry signals within the metal layer do not connect to the via staples.

10. The apparatus of claim 9, wherein each of the first plurality of standard cells include locations for via staples, first gate electrode elements, and first metal elements; and wherein each of the second plurality of standard cells include:

locations for via staples that are shifted a number of gate electrode pitches from corresponding locations for via staples in the respective first plurality of standard cells, and second metal elements are placed differently than corresponding first metal elements in the respective first plurality of standard cells.

11. The apparatus of claim 9, wherein the via staples are located at regular intervals of a multiple of the metal pitch.

12. The apparatus of claim 9, wherein the ratio of gate electrode pitch to metal pitch is such that three metal elements occur for every two gate electrode elements; and wherein the via staples occur at a pitch which is a multiple of every third metal element.

13. The apparatus of claim 9, wherein each of the second plurality of standard circuit cells is a version shifted one gate electrode pitch from a corresponding one of the first plurality of standard circuit cells.

14. The apparatus of claim 9, wherein each of the standard circuit cells include a spacing for the via staples; and wherein a location of the spacing for the via staples determines whether the standard cell is included in the first plurality of standard circuit cells or the second plurality of standard circuit cells.

15. The apparatus of claim 14, wherein each of the second plurality of standard cell includes a version of a corresponding one of the first plurality of standard circuit cells that is shifted such that the location of the spacing for the via staple aligns with both a via staple and the gate electrode pitch.

16. The apparatus of claim 14, further including a third plurality of standard circuit cells that include mirrored versions of portions of the first plurality and the second plurality of standard circuit cells, wherein each of the third plurality of standard circuit cells includes a flipped version of a corresponding one of the standard circuit cells that is flipped in such a way that the location of the spacing for the via staple aligns with both a via staple and the gate electrode pitch.

17. An apparatus comprising:

a place-and-route tool configured to place standard circuit cells within a circuit design, the place-and-route tool configured to:

establish a metal layer having a metal pitch between metal elements;

establish a gate electrode layer having a gate pitch between gate electrode elements, wherein the gate electrode pitch is an unequal ratio of the metal pitch;

route at least one power rail coupled, by via staples, with the metal layer, wherein a first set of via staples associated with a first power rail are unaligned with respect to a second set of via staples associated with a second power rail;

place a first plurality of standard cells, each respectively located in a even first placement site wherein portions of the standard cells that carry signals within the metal layer do not connect to the via staples; and place a second plurality of standard cells, one or more of the second plurality of standard cells being a shifted version of a corresponding one of the first plurality of standard cells, and each of the second plurality of standard cells is respectively located in a second placement site wherein portions of the standard cells that carry signals within the metal layer do not connect to the via staples.

18. The apparatus of claim 17, wherein place-and-route tool configured to:

create a ratio of gate electrode pitch to metal pitch such that three metal elements occur for every two gate electrode elements; and set the via staples to occur at a pitch which is a multiple of every third metal element.

* * * * *